(12) United States Patent
Huang et al.

(10) Patent No.: US 11,561,323 B2
(45) Date of Patent: Jan. 24, 2023

(54) INTELLIGENT STORAGE DEVICE AND INTELLIGENT STORAGE METHOD

(71) Applicant: Industrial Technology Research Institute, Hsinchu (TW)

(72) Inventors: Hsin-Chien Huang, Hsinchu (TW); Po-Yuan Hsiao, Taipei (TW); Chu-An Chung, Hsinchu County (TW); Wen Tsui, Hsinchu County (TW); Chi-Chou Chiang, Chiayi (TW)

(73) Assignee: Industrial Technology Research Institute, Hsinchu (TW)

( * ) Notice: Subject to any disclaimer, the term of this patent is extended or adjusted under 35 U.S.C. 154(b) by 0 days.

(21) Appl. No.: 17/121,781

(22) Filed: Dec. 15, 2020

(65) Prior Publication Data

US 2022/0137256 A1 May 5, 2022

(30) Foreign Application Priority Data

Nov. 5, 2020 (TW) .................................. 109138572

(51) Int. Cl.
*G01V 8/20* (2006.01)
*G01V 9/00* (2006.01)
*G06V 20/00* (2022.01)

(52) U.S. Cl.
CPC .................. *G01V 8/20* (2013.01); *G01V 9/00* (2013.01); *G06V 20/00* (2022.01)

(58) Field of Classification Search
CPC ........ G01V 8/20; G01V 9/00; G06K 9/00624; G06V 20/00
See application file for complete search history.

(56) References Cited

U.S. PATENT DOCUMENTS

| 6,435,407 B1 * | 8/2002 | Fiordelisi ............... G06Q 30/06 235/383 |
| 10,046,229 B2 | 8/2018 | Tran et al. |
| 10,055,657 B2 | 8/2018 | Fang et al. |

(Continued)

FOREIGN PATENT DOCUMENTS

| CN | 106064734 | 11/2016 |
| CN | 106530529 | 3/2017 |

(Continued)

OTHER PUBLICATIONS

Office Action of Taiwan Counterpart Application, dated Jul. 2, 2021, pp. 1-9.

*Primary Examiner* — Alexander Satanovsky
*Assistant Examiner* — Lynda Dinh
(74) *Attorney, Agent, or Firm* — JCIPRNET

(57) ABSTRACT

An intelligent storage device and an intelligent storage method are provided. The intelligent storage device includes a storage space, an infrared sensor, a weight sensor, a transceiver, and a processor. The storage space is suitable for storing an object. The infrared sensor senses the storage space to generate infrared sensing data. The weight sensor senses the object in the storage space to generate weight sensing data. The processor is coupled to the infrared sensor, the weight sensor, and the transceiver, determines whether the object is placed in or removed from the storage space according to the infrared sensing data and the weight sensing data to generate an event record, and transmits the event record via the transceiver.

12 Claims, 6 Drawing Sheets

(56) References Cited

U.S. PATENT DOCUMENTS

| | | | |
|---|---|---|---|
| 10,105,288 B1 * | 10/2018 | Nosrati | ................. A61J 7/0481 |
| 10,176,456 B2 * | 1/2019 | Puerini | .............. G06K 9/00771 |
| 10,268,983 B2 * | 4/2019 | Kumar | ................. G06Q 10/087 |
| 10,922,648 B2 * | 2/2021 | Rogers | ................... B25H 3/028 |
| 11,080,439 B2 * | 8/2021 | Wodrich | ................. G01S 19/48 |
| 2015/0025969 A1 | 1/2015 | Schroll et al. | |
| 2015/0046820 A1 | 2/2015 | Gazdzinski | |
| 2018/0146833 A1 | 5/2018 | Halloran et al. | |
| 2019/0108396 A1 * | 4/2019 | Dal Mutto | ........... G06K 9/6267 |
| 2020/0160637 A1 | 5/2020 | Hara | |

FOREIGN PATENT DOCUMENTS

| | | |
|---|---|---|
| CN | 109785503 | 5/2019 |
| CN | 210324414 | 4/2020 |
| CN | 211787297 | 10/2020 |
| TW | 200806035 | 1/2008 |
| TW | 201525903 | 7/2015 |
| WO | 9838589 | 9/1998 |
| WO | 2017015550 | 1/2017 |

* cited by examiner

INTELLIGENT STORAGE DEVICE AND INTELLIGENT STORAGE METHOD

CROSS-REFERENCE TO RELATED APPLICATION

This application claims the priority benefit of Taiwan application serial no. 109138572, filed on Nov. 5, 2020. The entirety of the above-mentioned patent application is hereby incorporated by reference herein and made a part of this specification.

TECHNICAL FIELD

The disclosure relates to an intelligent storage device and an intelligent storage method.

BACKGROUND

In order to save the labor cost, technologies relating to intelligent shop systems are under progressive development. An existing intelligent storage device usually uses an image of a storage space to determine whether an object is taken from or placed in the storage space. However, misjudgment may easily occur if only images are used. For example, when an object is moved from one position in the storage space to another position in the storage space, a conventional intelligent storage device relying on image recognition technology may misjudge the moved object as having been removed from the storage space. Therefore, further efforts are required in the development of intelligent storage device.

SUMMARY

An intelligent storage device according to an aspect of the disclosure includes a storage space, an infrared sensor, a weight sensor, a transceiver, and a processor. The storage space is suitable for storing an object. The infrared sensor senses the storage space to generate infrared sensing data. The weight sensor senses the object in the storage space to generate weight sensing data. The processor is coupled to the infrared sensor, the weight sensor, and the transceiver, wherein the processor determines whether the object is placed in or removed from the storage space according to the infrared sensing data and the weight sensing data so as to generate an event record, and transmits the event record via the transceiver.

An intelligent storage method according to another aspect of the disclosure includes: sensing a storage space by an infrared sensor to generate infrared sensing data; sensing an object in the storage space by a weight sensor to generate weight sensing data; and determining whether the object is placed in or removed from the storage space according to the infrared sensing data and the weight sensing data so as to generate an event record, and transmitting the event record.

In order to make the above features and advantages of the disclosure more obvious and comprehensible, embodiments accompanied with drawings are described in detail below.

DETAILED DESCRIPTION OF DISCLOSED EMBODIMENTS

The disclosure provides an intelligent storage device and an intelligent storage method capable of determining whether an object is placed in or removed from a storage space.

The intelligent storage device of the disclosure is capable of using an infrared sensor and a weight sensor to determine whether an object is taken from a storage space or placed in the storage space to generate an event record, and outputting the event record to assist an intelligent shop system to confirm the whereabouts of the object.

Figure 1:
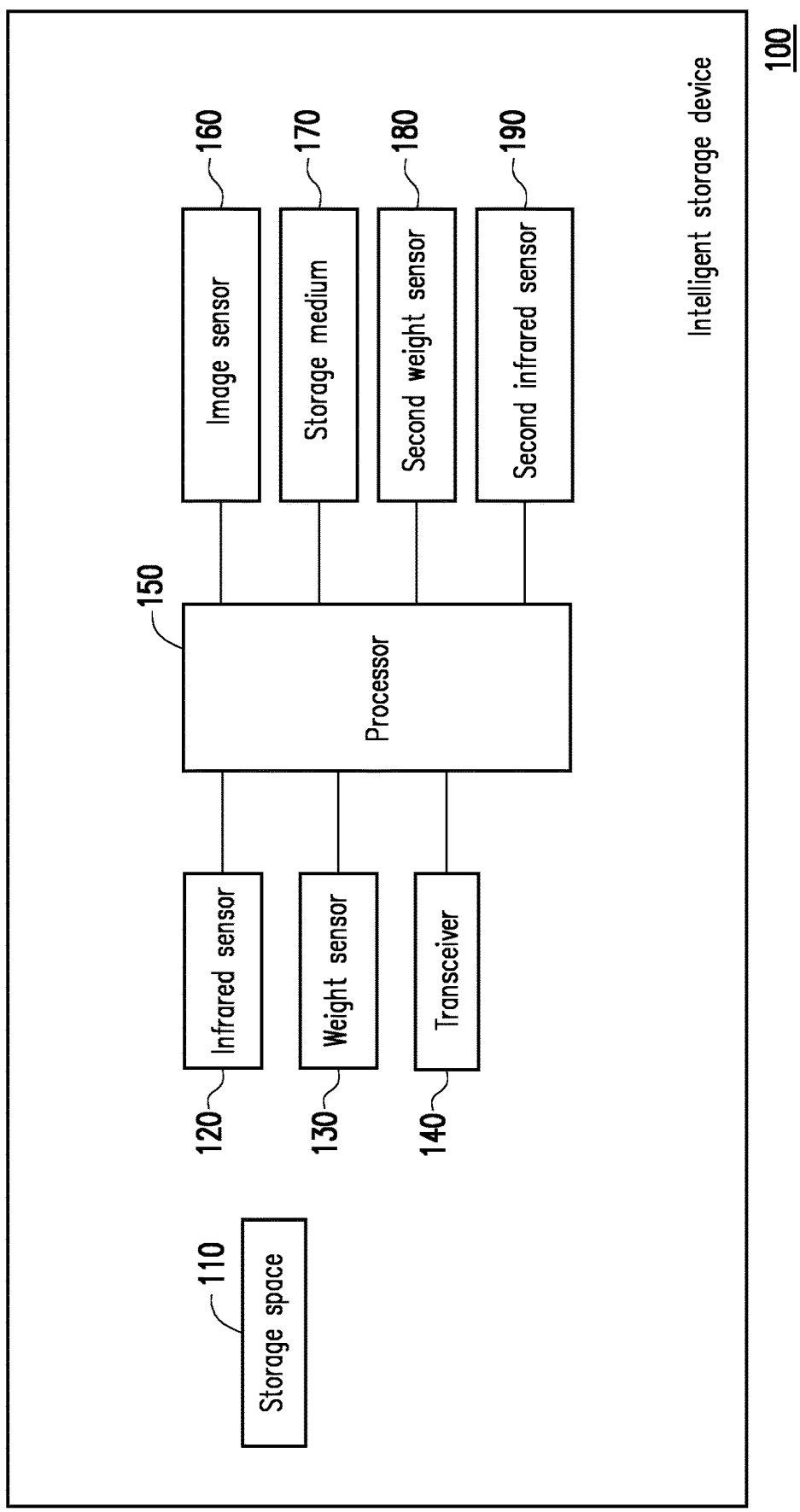
FIG. 1 is a schematic diagram of an intelligent storage device according to an embodiment of the disclosure.

FIG. 1 is a schematic diagram of an intelligent storage device 100 according to an embodiment of the disclosure. The intelligent storage device 100 may include a storage space 110, an infrared sensor 120, a weight sensor 130, a transceiver 140, and a processor 150. In an embodiment, the intelligent storage device 100 may further include a storage medium 170, a second weight sensor 180, and a second infrared sensor 190. The intelligent storage device 100 may be disposed in a general store or an intelligent unmanned store, but the disclosure is not limited thereto.

The storage space 110 is suitable for storing an object. Based on the type of the intelligent storage device 100, the storage space 110 may have multiple different forms. For example, the storage space 110 may be a locker, a freezer, an iron stand, or a veneer sheet.

The infrared sensor 120 (or the second infrared sensor 190) may be coupled to the processor 150, and can sense the storage space 110 to generate infrared sensing data. For example, the infrared sensor 120 may transmit infrared a ray to the storage space 110. When the infrared ray is shielded by the object in the storage space 110 (such as a hand reaching into the storage space 110), the infrared sensor 120 can be triggered to start generating infrared sensing data. When the infrared ray is not shielded by the object in the storage space 110, the infrared sensor 120 can be triggered to stop generating infrared sensing data.

The weight sensor 130 (or the second weight sensor 180) may be, for example, a general electronic scale. The weight sensor 130 may be coupled to the processor 150, and can sense the object in the storage space 110 to generate weight sensing data. The weight sensing data may include a weight of the object in the storage space 110.

In an embodiment, the processor 150 can determine whether the object is placed in or removed from the storage space 110 according to a weight threshold value and the weight sensing data. For example, the weight threshold value may be set to 10 grams. The processor 150 can determine a change of the weight of the object in the storage space 110 according to the weight sensing data. If the increase in the weight of the object in the storage space 110 exceeds 10 grams, the processor 150 can determine that an object is placed in the storage space 110. If the decrease in the weight of the object in the storage space 110 exceeds 10 grams, the processor 150 can determine that an object is removed from the storage space 110.

The transceiver 140 may transmit and receive signals in a wireless or wired manner.

The processor 150 may be, for example, a central processing unit (CPU), or other programmable general-purpose or special-purpose components such as a micro control unit (MCU), a microprocessor, a digital signal processor (DSP), a programmable controller, an application specific integrated circuit (ASIC), a graphics processing unit (GPU), an arithmetic logic unit (ALU), a complex programmable logic device (CPLD), a field programmable gate array (FPGA), or other similar components, or a combination of the above components. The processor 150 may be coupled to the infrared sensor 120, the weight sensor 130, and the transceiver 140. The processor 150 can determine whether the object is placed in or removed from the storage space 110 according to the infrared sensing data and/or the weight sensing data so as to generate an event record, and transmit the event record via the transceiver 140. For example, the processor 150 may transmit the event record to an intelligent shop system via the transceiver 140 to assist the intelligent shop system to confirm whether a customer has taken the object in the storage space 110.

The storage medium 170 may be, for example, any type of fixed or movable components such as a random access memory (RAM), a read-only memory (ROM), a flash memory, a hard disk drive (HDD), a solid state drive (SSD), or similar components, or a combination of the above components, and is configured to store multiple modules or various application programs that can be executed by the processor 150.

Figure 2:
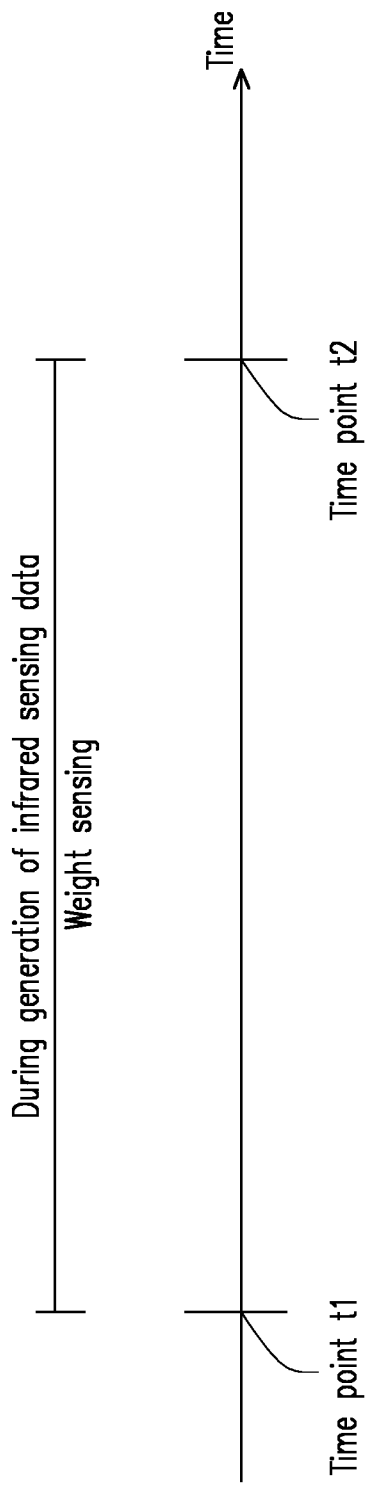
FIG. 2 is a schematic diagram of determining whether an object is placed in or removed from a storage space according to an embodiment of the disclosure.

FIG. 2 is a schematic diagram of determining whether the object is placed in or removed from the storage space 110 according to an embodiment of the disclosure. Referring to FIG. 2, the infrared sensor 120 can generate infrared sensing data between a time point t1 and a time point t2, wherein the time point t2 is later than the time point t1. Specifically, the infrared sensing data may be generated when the infrared ray emitted by the infrared sensor 120 is shielded (for example, at the time point t1, the hand of a user, reaching into the storage space 110, shields the infrared ray), and the infrared sensing data may be no longer generated when the infrared ray emitted by the infrared sensor 120 is no longer shielded (for example, at the time point t2, the hand of the user, leaving the storage space 110, no longer shields the infrared ray).

The processor 150 can determine whether the weight sensing data changes during the generation of the infrared sensing data (that is, between the time point t1 and the time point t2). The processor 150 can determine whether the object is placed in or removed from the storage space 110 in response to a change of the weight sensing data between the time point t1 and the time point t2 so as to generate a corresponding event record. Referring to a time axis shown in FIG. 2, the processor 150 can obtain the weight sensing data of the storage space 110 at the time point t1 and the time point t2 from the weight sensor 130 respectively, and determine the weight of the storage space 110 at the time point t1 and at the time point t2 according to the weight sensing data. If the weight sensing data changes between the time point t1 and the time point t2 and the weight of the storage space 110 at the time point t2 is less than the weight of the storage space 110 at the time point t1, the processor 150 can determine that an object is removed from the storage space 110, and can generate an event record that records "an object is removed from the storage space". If the weight of the storage space 110 at the time point t2 is greater than the weight of the storage space 110 at the time point t1, the processor 150 can determine that an object is placed in the storage space 110, and can generate an event record that records "an object is placed in the storage space".

In an embodiment, the processor 150 may turn on the weight sensor 130 after the time point t1 and turn off the weight sensor 130 after the time point t2 so as to save power.

In an embodiment, the intelligent storage device 100 of the disclosure may further include an image sensor 160. The image sensor 160 may be a general camera or a monitoring device. The image sensor 160 may be coupled to the processor 150. The image sensor 160 can sense the storage space 110 to generate image sensing data. The image sensing data may include an image corresponding to the object in the storage space 110.

The processor 150 can determine whether the object is placed in or removed from the storage space 110 according to the image sensing data so as to generate an event record. In addition, the processor 150 can use the image sensor and the weight sensor at the same time to determine whether the object is placed in or removed from the storage space 110.

Figure 3:
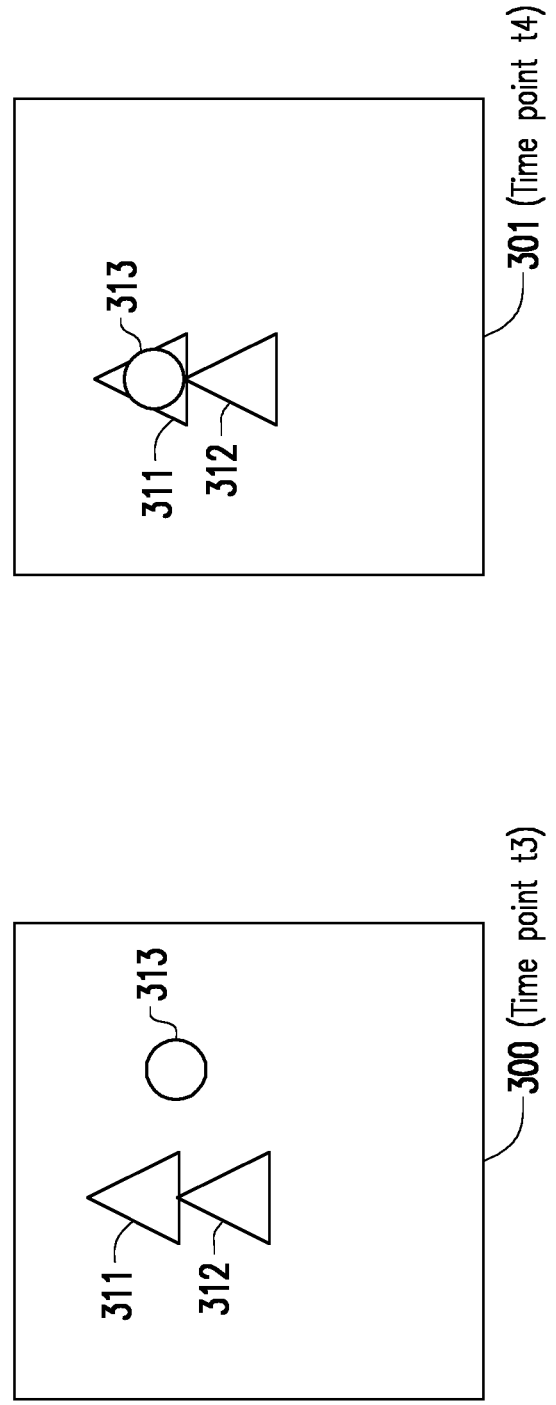
FIG. 3 is a schematic diagram of image sensing data of the intelligent storage device according to an embodiment of the disclosure.

FIG. 3 is a schematic diagram of the image sensing data of the intelligent storage device 100 according to an embodiment of the disclosure. As shown in FIG. 3, the storage space 110 of the intelligent storage device 100 may include an object 311, an object 312 and an object 313. The image sensor 160 may sense the object in the storage space 110 to generate image sensing data corresponding to the sensed objects 311, 312, and 313. The image sensing data may include image sensing data 300 corresponding to the time point t3 and image sensing data 301 corresponding to the time point t4, wherein the time point t4 is later than the time point t3. In the example shown in FIG. 3, assuming that a person moves the object 313 to the front of the object 311 between the time point t3 and the time point t4 and the object 311 is not removed from the storage space 110, since the image sensing data 300 corresponding to the time point t3 is different from the image sensing data 301 corresponding to the time point t4, if the processor 150 only uses an image difference to determine whether an object is removed from the storage space 110, the processor 150 may misjudge that the object is removed from the storage space 110 between the time point t3 and the time point t4.

In order to avoid misjudgment, the intelligent storage device 100 can simultaneously use the image sensing data generated by the image sensor 160 and the weight sensing data generated by the weight sensor 130 to determine whether an object is placed in or removed from the storage space 110. Specifically, as shown in FIG. 3, the weight sensor 130 may obtain the weight sensing data of the storage space 110 at the time point t3 and the weight sensing data of the storage space 110 at the time point t4 respectively. Assuming that the weight sensing data at the time point t3 is the same as the weight sensing data at the time point t4, but the image sensing data 300 at the time point t3 is different from the image sensing data 301 at the time point t4, the processor 150 can determine that no object is placed in or removed from the storage space 110 between the time point t3 and the time point t4, but an object is moved from one position in the storage space 110 to another position in the storage space 110. Therefore, between the time point t3 and the time point t4, the processor 150 may not generate an event record. In another embodiment, assuming that the weight sensing data at the time point t3 is different from the weight sensing data at the time point t4 and the image sensing data 300 at the time point t3 is different from the image sensing data 301 at the time point t4, the processor 150 can determine that an object is placed in or removed from the storage space 110 between the time point t3 and the time point t4 so as to generate an event record.

The processor 150 can determine whether the object is placed in or removed from the storage space 110 according to an image threshold value and the image sensing data. For example, the image threshold value may be set to a preset pixel number. In an embodiment, according to the sizes of different objects (such as the object 311, the object 312, and the object 313) and a mounting position, an angle, a field of view and other parameters of the image sensor 160, the processor 150 can calculate a length, a width and an area of each object on the image sensor 160, and can respectively set an image threshold value for each object (such as the object 311, the object 312, and the object 313) based on the calculated length, width and area.

The processor 150 can determine an image change of the storage space 110 according to the image sensing data. If the image change of the storage space 110 between the time point t3 and the time point t4 exceeds the preset pixel number, the processor 150 can determine that an object is placed in or removed from the storage space 110 and generate a corresponding event record.

Figure 4:
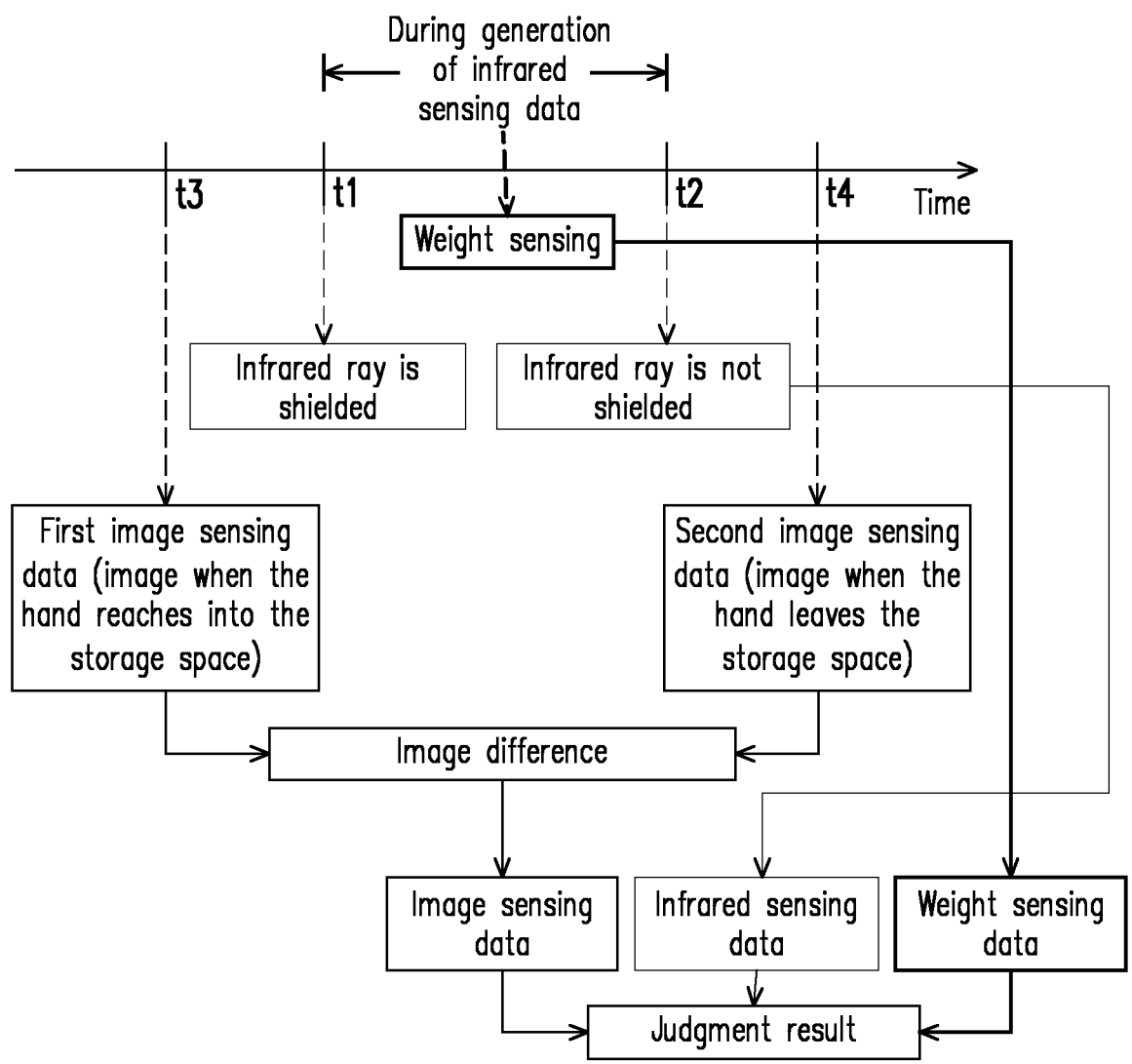
FIG. 4 is a schematic diagram of a method for determining whether the object is placed in or removed from the storage space according to an embodiment of the disclosure.

FIG. 4 is a schematic diagram of a method for determining whether an object is placed in or removed from the storage space 110 according to an embodiment of the disclosure. Referring to a time axis shown in FIG. 4, when the infrared ray emitted by the infrared sensor 120 is shielded at the time point t1 (for example, the hand of a user reaches into the storage space 110), the infrared sensor 120 can be triggered to start generating infrared sensing data. When the infrared ray is no longer shielded at the time point t2 (for example, the hand of the user leaves the storage space 110), the infrared sensor 120 can be triggered to stop generating infrared sensing data. The image sensing data may include first image sensing data corresponding to the time point t3 and second image sensing data corresponding to the time point t4, wherein the first image sensing data may be, for example, an image of the hand of the user before reaching into the storage space 110 at the time point t3, and the second image sensing data may be an image of the hand of the user after leaving the storage space 110 at the time point t4.

The processor 150 can determine whether the object is placed in or removed from the storage space 110 according to the weight sensing data and the image sensing data so as to generate an event record that records a judgment result. Specifically, the processor 150 may determine a weight change of the object in the storage space 110 between the time point t1 and the time point t2 according to the infrared sensing data and the weight sensing data. The processor 150 can determine whether the object is placed in or removed from the storage space 110 according to the weight change so as to generate a preliminary judgment result. For example, the processor 150 may determine that the object is placed in the storage space 110 based on the condition that the increase in the weight of the object exceeds the weight threshold value, and may determine that the object is removed from the storage space 110 based on the condition that the decrease in the weight of the object exceeds the weight threshold value.

If the preliminary judgment result indicates that an object is placed in or removed from the storage space 110, the processor 150 can further determine the image change of the storage space 110 between the time point t3 and the time point t4 according to the image sensing data. The processor 150 can determine whether the object is placed in or removed from the storage space 110 according to the image change so as to generate a judgment result. For example, the processor 150 may determine whether the object is placed in or removed from the storage space 110 based on the condition that the image change between the time point t3 and the time point t4 exceeds the image threshold value.

After the event record is generated, the processor 150 may transmit the event record via the transceiver 140. The event record may be transmitted to an intelligent shop system to assist the intelligent shop system to more accurately record the process of taking or placing the object in the storage space 110. The disclosure does not limit the application mode of the event record.

Figure 5:
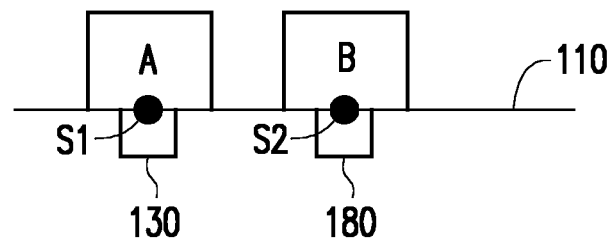
FIG. 5 is a schematic diagram of the storage space according to an embodiment of the disclosure.

FIG. 5 is a schematic diagram of the storage space 110 according to an embodiment of the disclosure. The storage space 110 may include a position S1 and a position S2. The position S1 may be configured to place an object A, and the position S2 may be configured to place an object B. The storage medium 170 can store storage information corresponding to the storage space 110. The storage information can indicate the object and a position of the object in the storage space 110. For example, the storage information may indicate that the storage space 110 includes the object A, and the object A is placed at the position S1. The storage information may also indicate that the storage space 110 includes the object B, and the object B is placed at the position S2.

The storage medium 170 can also store a plurality of reference weight change patterns corresponding to the weight sensor 130 and the second weight sensor 180, wherein the plurality of reference weight change patterns respectively correspond to a plurality of positions in the storage space 110. For example, the storage medium 170 may store a first reference weight change pattern corresponding to the position S1 and may store a second reference weight change pattern corresponding to the position S2.

The reference weight change pattern may include information about a weight change measured by the weight sensor 130 and the second weight sensor 180 when an object is placed in or removed from the storage space 110. Assuming that the weight sensor 130 and the second weight sensor 180 are respectively disposed at different positions in the storage space 110, in order to generate a reference weight change pattern for each position in the storage space 110, when no object is placed in the storage space 110, the user can place a weight with a fixed weight (such as 100 grams) at the position S1. After the weight is placed at the position S1, the weight sensing data of the weight sensor 130 and second weight sensing data of the second weight sensor 180 will change. The storage medium 170 can regard the change as the first reference weight change pattern corresponding to the position S1, and can store the first reference weight change pattern.

After the above steps are also performed on the position S2, the storage medium 170 can record the contents shown in Table 1. In Table 1, a change of the weight sensing data and a change of the second weight sensing data corresponding to the position S1 can be the first reference weight change pattern corresponding to the position S1, and a change of the weight sensing data and a change of the second weight sensing data corresponding to the position S2 can be the second reference weight change pattern corresponding to the position S2.

TABLE 1

| Position | Change of weight sensing data | Change of second weight sensing data |
| --- | --- | --- |
| S1 | 149.9683 | 11.87 |
| S2 | 65.78 | 156.82 |

After the reference weight change patterns shown in Table 1 are established, if an object is placed in or removed from the storage space 110, the weight sensor 130 and the second weight sensor 180 can respectively measure the change of the weight sensing data and the change of the second weight sensing data. The processor 150 can determine whether the object at a specific position is placed in or removed from the storage space 110 in response to the change of the weight sensing data and the change of the second weight sensing data matching the reference weight change pattern of the specific position. For example, if the change of the weight sensing data and the change of the second weight sensing data are matched with the first reference weight change pattern at the position S1 in Table 1, the processor 150 can determine that the object at the position S1 is placed in or removed from the storage space 110. The processor 150 may learn that the object A is placed at the position S1 according to the storage information. Therefore, the processor 150 can recognize that the object placed in or removed from the storage space 110 is the object A so as to generate an event record.

It should be noted that although the storage space 110 in the above embodiments may include two weight sensors, the disclosure is not limited thereto. For example, the storage space 110 may be provided with N weight sensors, and N is any positive integer. In other words, the reference weight change pattern at one position may correspond to N weight sensors.

Figure 6A:
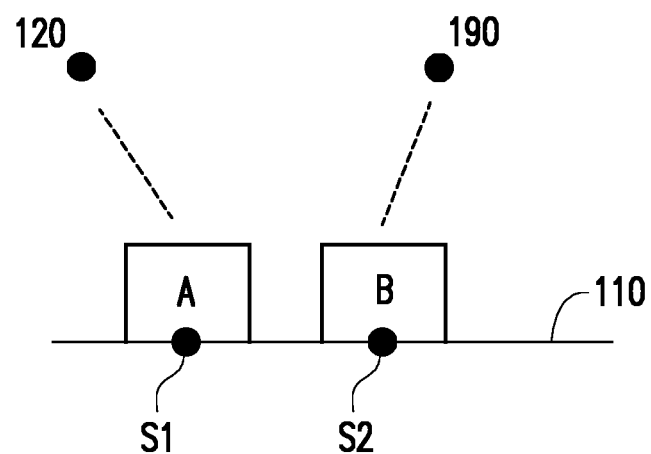
FIG. 6A is another schematic diagram of the storage space according to an embodiment of the disclosure.

FIG. 6A is another schematic diagram of the storage space 110 according to an embodiment of the disclosure. The storage space 110 may include a position S1 and a position S2. The position S1 may be configured to place an object A, and the position S2 may be configured to place an object B. The storage medium 170 may store storage information corresponding to the storage space 110. The storage information may indicate the object and the position of the object in the storage space 110. For example, the storage information may indicate that the storage space 110 includes the object A, and the object A is placed at the position S1. The storage information may also indicate that the storage space 110 includes the object B, and the object B is placed at the position S2.

The storage medium 170 may also store position information corresponding to the infrared sensor. The position information may indicate the infrared sensor and a position in the storage space 110 that can be detected by the infrared sensor. For example, the infrared sensor 120 and the second infrared sensor 190 may be configured to detect different positions in the storage space 110. The infrared sensor 120 may be configured to detect the position S1 in the storage space 110, and the second infrared sensor 190 may be configured to detect the position S2 in the storage space 110. The position information stored in the storage medium 170 may indicate that the infrared sensor 120 corresponds to the position S1, and the second infrared sensor 190 corresponds to the position S2.

If the infrared sensor 120 is triggered when an object is placed in or removed from the storage space 110, the infrared sensor 120 can generate infrared sensing data. On the other hand, if the second infrared sensor 190 is triggered when an object is placed in or removed from the storage space 110, the second infrared sensor 190 can generate second infrared sensing data. The processor 150 can determine whether an object at a specific position is placed in or removed from the storage space 110 according to the infrared sensing data or the second infrared sensing data. For example, the processor 150 can determine whether the object corresponding to the position S1 of the infrared sensor 120 is placed or removed in response to the infrared sensing data generated by the infrared sensor 120. The processor 150 can learn that the object A is placed at the position S1 according to the storage information. Therefore, the processor 150 can recognize that the object placed in or removed from the storage space 110 is the object A so as to generate an event record.

It should be noted that although the storage space 110 in the above embodiments may include two infrared sensors, the disclosure is not limited thereto. For example, the storage space 110 may be provided with N infrared sensors, the N infrared sensors may respectively correspond to M positions in the storage space 110, and N and M are any positive integers.

Figure 6B:
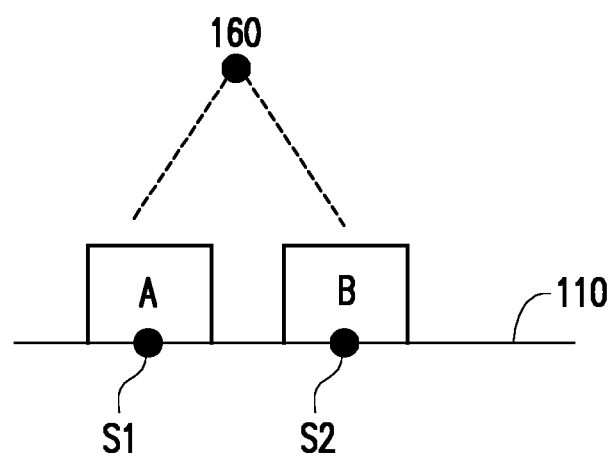
FIG. 6B is another schematic diagram of the storage space according to an embodiment of the disclosure.

FIG. 6B is another schematic diagram of the storage space 110 according to an embodiment of the disclosure. Similar to FIG. 6A, the storage space 110 in FIG. 6B may also include a position S1 and a position S2, and the storage medium 170 may store the aforementioned storage information and the position information corresponding to the infrared sensors (the infrared sensor 120 and the second infrared sensor 190), and the descriptions thereof are omitted herein.

The image sensor 160 may be configured to detect different positions in the storage space 110 and generate corresponding image sensing data. For example, the image sensor 160 may be configured to detect the position S1 and the position S2 in the storage space 110. The storage information stored in the storage medium 170 can indicate the type of the object corresponding to the position S1 and the type of the object corresponding to the position S2.

The image sensing data may include first image sensing data corresponding to the first time point and second image sensing data corresponding to the second time point, wherein the second time point may be later than the first time point. For example, the first image sensing data and the second image sensing data may be related to the position S1 and the position S2. If an object is placed in or removed from the storage space 110 between the first time point and the second time point, the image sensing data may change. In response to the change of the image sensing data between the first time point and the second time point, the processor 150 can determine that an object at a specific position in the storage space 110 is moved according to the method described in the embodiment of FIG. 6A, i.e., according to the infrared sensing data or the second infrared sensing data between the first time point and the second time point.

For example, in response to the change of the image sensing data between the first time point and the second time point, the processor 150 can determine that the object at the position S1 is moved according to the detection result of the infrared sensor 120 and/or the second infrared sensor 190. The processor 150 can generate an event record based on this.

Figure 7A:
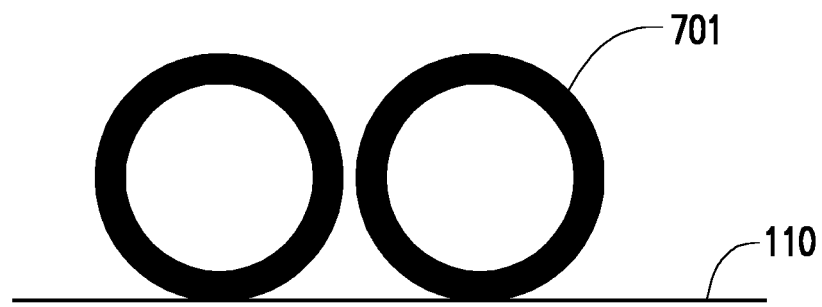
FIG. 7A is a schematic diagram of recognizing an object according to an embodiment of the disclosure.

In an embodiment, the storage medium 170 can store image data of each object (such as a photo of the object). The processor 150 can use the image sensing data generated by the image sensor 160 to recognize objects and the number of objects. FIG. 7A is a schematic diagram of recognizing an object according to an embodiment of the disclosure. Referring to FIG. 7A, if the image sensing data 701 generated by the image sensor 160 is clear (for example, no object is shielded), the processor 150 can compare the image sensing data with image data pre-stored in the storage medium 170. If the image sensing data is matched with the object in the image data stored in the storage medium 170, the processor 150 can recognize the objects in the image sensing data and the number of objects. The processor 150 can further confirm the object in the image sensing data according to the storage information. For example, if the processor 150 determines that the object moved at the position S1 may be the object A or the object B according to the image sensing data, the processor 150 can determine that the moved object is the object A in response to the storage information indicating that the position S1 corresponds to the object A. Based on this, the processor 150 can determine the types and number of objects placed in or removed from the storage space 110 based on the change of the image sensing data.

In another embodiment, the storage medium 170 may store the weight data of each object, such as the weight data Wa of the object A, the weight data Wb of the object B, and the weight data Wc of the object C.

Figure 7B:
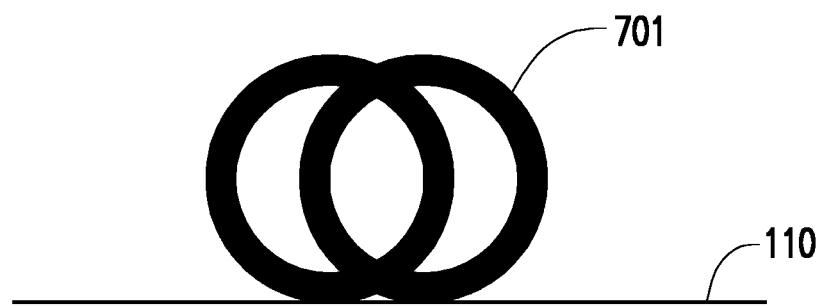
FIG. 7B is another schematic diagram of recognizing an object according to an embodiment of the disclosure.

FIG. 7B is another schematic diagram for recognizing an object according to an embodiment of the disclosure. Simultaneously referring to FIG. 6B and FIG. 7B, if the image sensing data 702 generated by the image sensor 160 is not clear (for example, an object is shielded or partially overlapped), after the processor 150 compares the image sensing data with the image data pre-stored in the storage medium 170, the processor 150 will find that the image sensing data 702 cannot be completely matched with the object in the image data stored in the storage medium 170. The processor 150 can recognize which object is placed in or removed from the storage space 110 via a manner of the aforementioned embodiment of FIG. 6A (determining whether the infrared sensing data and the second infrared sensing data are matched with the position information). Assuming that the processor 150 recognizes that the objects placed in or removed from the storage space 110 are the object A and the object B, the processor 150 can recognize the number of objects according to the weight data and the weight sensing data so as to generate an event record. For example, assuming that the weight sensing data at this time (the weight increased or decreased when an object is removed from the storage space 110) is W grams, the processor 150 can calculate the number Na of objects A and the number Nb of objects B (Na and Nb are positive integers) by the following formula 1.

$$Na*Wa+Nb*Wb=W \quad \text{(Formula 1)}$$

That is, after recognizing that the objects placed in or removed from the storage space 110 are the object A and the object B, The processor 150 of the disclosure can recognize the number Na of objects A and the number Nb of objects B according to the weight data (Wa, Wb) of each object pre-stored in the storage medium 170, the weight sensing data (W grams) generated by the weight sensor 130 and the formula 1, so as to generate an event record.

Figure 8:
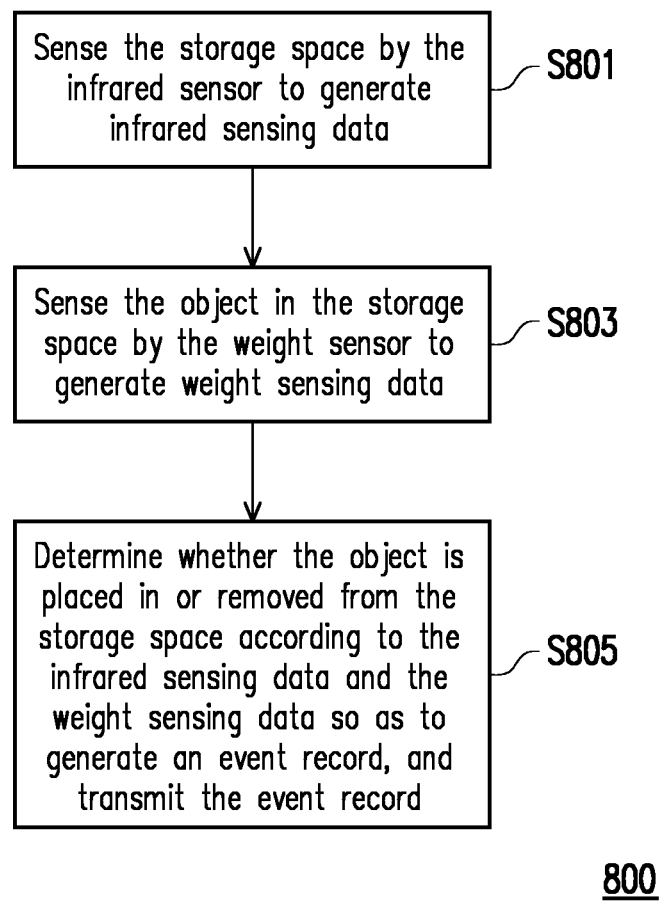
FIG. 8 is a flowchart of an intelligent storage method according to an embodiment of the disclosure.

FIG. 8 is a flow chart of an intelligent storage method 800 according to an embodiment of the disclosure. The intelligent storage method 800 can be implemented by the intelligent storage device 100 shown in FIG. 1. In S801, the infrared sensor senses a storage space to generate infrared sensing data. In S803, the weight sensor senses the object in the storage space to generate weight sensing data. In S805, whether the object is placed in or removed from the storage space is determined according to the infrared sensing data and the weight sensing data so as to generate an event record, and the event record is transmitted.

In view of the above, the intelligent storage device of the disclosure is capable of using the infrared sensor and the weight sensor to determine whether the object is placed in or removed from the storage space, and generating the event record. In addition, the intelligent storage device is further capable using the image sensor to generate image sensing data, confirming whether the image sensing data changes to determine whether the object is placed in or removed from the storage space, and generating the event record. Therefore, the whereabouts of the object in the storage space can be accurately confirmed. The recognition rate of the conventional technology for recognizing an object in the storage space through image recognition is lower due to factors such as shielding, and the conventional technology consumes a large amount of computing resources. The processor of the disclosure may start computing when the infrared sensor and the weight sensor are triggered, so a large amount of computing resources can be saved.

Although the disclosure has been disclosed above by way of embodiments, it is not intended to limit the disclosure. It is apparent to a person of ordinary skill in the art that various modifications and variations can be made without departing from the spirit and scope of the disclosure. In view of the foregoing, the scope of protection of the disclosure will be defined by the scope of the appended claims.

What is claimed is:

1. An intelligent storage device, comprising:
   a storage space;
   a first infrared sensor of a plurality of infrared sensors, sensing the storage space to generate a first infrared sensing data between a first time point and a second time point, wherein an infrared ray emitted by the first infrared sensor is shielded at the first time point and is no longer shielded after the second time point, and wherein the second time point is later than the first time point;
   a first weight sensor of a plurality of weight sensors, sensing the storage space to generate a first weight sensing data;
   a second weight sensor of the plurality of weight sensors, sensing the storage space to generate a second weight sensing data;
   a transceiver;
   a storage medium, storing storage information corresponding to the storage space and storing a reference weight change pattern corresponding to the first weight sensor and the second weight sensor, wherein the storage information indicates whether a position in the storage space is for an object, and wherein the reference weight change pattern corresponds to the position; and
   a processor coupled to the first infrared sensor, the first weight sensor, the second weight sensor, the storage medium, and the transceiver, wherein
   the processor determines whether the object is being placed in or removed from the position in the storage space according to the first infrared sensing data the first weight sensing data, and the second weight sensing data and recognizes the object according to the storage information so as to generate an event record in response to the first weight sensing data and the second weight sensing data between the first time point and the second time point matching the reference weight change pattern, and transmits the event record via the transceiver.

2. The intelligent storage device according to claim 1, further comprising:
an image sensor, coupled to the processor, wherein the image sensor senses the storage space to generate image sensing data, and wherein
the processor determines whether the object is being placed in or removed from the storage space according to the image sensing data so as to generate the event record.

3. The intelligent storage device according to claim 2, wherein the processor determines whether the object is being placed in or removed from the storage space according to an image threshold value and the image sensing data corresponding to the object.

4. The intelligent storage device according to claim 2, wherein
the image sensing data comprises first image sensing data corresponding to a third time point and second image sensing data corresponding to a fourth time point, and wherein
the processor generates the event record in response to the second image sensing data being different from the first image sensing data.

5. The intelligent storage device according to claim 1, further comprising:
a second infrared sensor of the plurality of infrared sensors, coupled to the processor, wherein the second infrared sensor senses the storage space to generate a second infrared sensing data between the first time point and the second time point, wherein the storage medium stores position information corresponding to the first infrared sensor and the second infrared sensor, wherein the position information indicates the first infrared sensor and the second infrared sensor correspond to the position, and wherein
the processor determines whether the object is being placed in or removed from the position in response to the first infrared sensing data or the second infrared sensing data between the first time point and the second time point matching the position information.

6. The intelligent storage device according to claim 5, further comprising:
an image sensor, coupled to the processor, the first infrared sensor, and the second infrared sensor, wherein the image sensor senses the storage space to generate image sensing data, wherein
the storage medium further stores image data corresponding to the object, wherein
in response to the image sensing data changing between a third time point and a fourth time point, the processor determines whether the object is being placed in or removed from the storage space according to the first infrared sensing data and the second infrared sensing data between the first time point and the second time point, and recognizes the object according to the image sensing data and the image data so as to generate the event record, and wherein the third time point is earlier than the first time point and the fourth time point is later than the second time point.

7. An intelligent storage method, comprising:
sensing a storage space by a first infrared sensor of a plurality of infrared sensors to generate a first infrared sensing data between a first time point and a second time point, wherein an infrared ray emitted by the first infrared sensor is shielded at the first time point and is no longer shielded after the second time point, and wherein the second time point is later than the first time point;
sensing the storage space by a first weight sensor of a plurality of weight sensors to generate a first weight sensing data and sensing the storage space by a second weight of the plurality of weight sensors sensor to generate a second weight sensing data;
storing storage information corresponding to the storage space and storing a reference weight change pattern corresponding to the first weight sensor and the second weight sensor, wherein the storage information indicates whether a position in the storage space is for an object, and wherein the reference weight change pattern corresponds to the position; and
determining whether the object is being placed in or removed from the position in the storage space according to the first infrared sensing data, the first weight sensing data, and the second weight sensing data and recognizing the object according to the storage information so as to generate an event record in response to the first weight sensing data and the second weight sensing data between the first time point and the second time point matching the reference weight change pattern, and transmitting the event record.

8. The intelligent storage method according to claim 7, further comprising:
sensing the storage space by an image sensor to generate image sensing data, wherein
generating the event record in response to the first weight sensing data changing between the first time point and the second time point comprises:
determining whether the object is being placed in or removed from the storage space according to the image sensing data to generate the event record.

9. The intelligent storage method according to claim 8, wherein determining whether the object is being placed in or removed from the storage space according to the image sensing data so as to generate the event record comprises:
determining whether the object is being placed in or removed from the storage space according to an image threshold value and the image sensing data corresponding to the object.

10. The intelligent storage method according to claim 8, wherein
the image sensing data comprises first image sensing data corresponding to a third time point and second image sensing data corresponding to a fourth time point, and wherein
determining whether the object is being placed in or removed from the storage space according to the image sensing data so as to generate the event record comprises: and
generating the event record in response to the second image sensing data being different from the first image sensing data.

11. The intelligent storage method according to claim 7, wherein determining whether the object is being placed in or removed from the storage space according to the first infrared sensing data and the first weight sensing data so as to generate the event record comprises:

sensing the storage space by a second infrared sensor of the plurality of infrared sensors to generate a second infrared sensing data between the first time point and the second time point;

storing position information corresponding to the first infrared sensor and the second infrared sensor, wherein the position information indicates the first infrared sensor and the second infrared sensor correspond to the position; and determining whether the object is being placed in or removed from the position in response to the first infrared sensing data or the second infrared sensing data between the first time point and the second time point matching the position information.

12. The intelligent storage method according to claim 11, further comprising:

sensing the storage space by an image sensor to generate image sensing data, wherein the image sensor is coupled to the first infrared sensor and the second infrared sensor;

further storing image data corresponding to the object by the storage medium; and in response to the image sensing data changing between a third time point and a fourth time point, determining whether the object is being placed in or removed from the storage space according to the first infrared sensing data and the second infrared sensing data between the first time point and the second time point, and recognizing the object according to the image sensing data and the image data so as to generate the event record, and wherein the third time point is earlier than the first time point and the fourth time point is later than the second time point.

* * * * *